United States Patent
Renders

(10) Patent No.: US 6,629,420 B2
(45) Date of Patent: Oct. 7, 2003

(54) METHOD AND DEVICE FOR TESTING AND DIAGNOSING AIR-CONDITIONING APPARATUS ON VEHICLES

(76) Inventor: Marie Joseph Renders, 46-3J. Springaeistraat, B-1651 Beersel (BE)

(*) Notice: Subject to any disclaimer, the term of this patent is extended or adjusted under 35 U.S.C. 154(b) by 0 days.

(21) Appl. No.: 09/919,087

(22) Filed: Jul. 31, 2001

(65) Prior Publication Data
US 2002/0029576 A1 Mar. 14, 2002

(30) Foreign Application Priority Data
Jul. 31, 2000 (EP) ............................................ 00116518

(51) Int. Cl.$^7$ ................................................. F25B 49/02
(52) U.S. Cl. ......................................... 62/129; 62/127
(58) Field of Search .......................... 62/126, 125, 127, 62/129, 130, 208, 209, 77, 298; 165/11.1; 236/94

(56) References Cited

U.S. PATENT DOCUMENTS

| | | | |
|---|---|---|---|
| 4,798,055 A | * 1/1989 | Murray et al. ................. | 62/127 |
| 5,009,076 A | 4/1991 | Winslow ...................... | 62/129 |
| 5,369,957 A | 12/1994 | Hanson ........................ | 62/126 |
| 5,724,822 A | * 3/1998 | Jonsson et al. ............... | 62/129 |
| 6,101,820 A | * 8/2000 | Cheballah ................. | 62/129 X |
| 6,240,733 B1 | * 6/2001 | Brandon et al. .............. | 62/129 |
| 6,330,802 B1 | * 12/2001 | Cummings et al. ....... | 62/127 X |

FOREIGN PATENT DOCUMENTS

| | | | |
|---|---|---|---|
| EP | 9854019 | 12/1998 | ...................... 1/32 |
| FR | 2772310 | 6/1999 | ...................... 1/32 |

* cited by examiner

Primary Examiner—Harry B. Tanner
(74) Attorney, Agent, or Firm—The Bilicki Law Firm, P.C.

(57) ABSTRACT

A device for testing and diagnosing air-conditioning apparatus of a car in the preferred embodiment comprises an control unit (1), indicated as CPU and having a microprocessor; a first sensor (2) for measuring the low pressure LP upstream of the compressor; a second sensor (3) for measuring the high pressure HP downstream the compressor, a third sensor (4) for measuring the environment temperature T$a$; fourth sensor (5) for measuring the temperature Ti at the air outlet in the car; possible sensors of auxiliary temperatures (5$a$ and 5$b$); a couple of connectors (6$a$, 6$b$) for measuring the voltage at the ends of the clutch cycling switch in orifice tube system with clutch cycling switch; a sensor of relative humidity (7); a data input unit (8), such as a keyboard; a unit (8$a$) for displaying the data, such as a alphanumeric LCD, and/or a printing unit (8$b$); a connector of type RS232 for communicating with a computer; an external memory unit (9), in particular a memory card, with relative interface. The device is capable of working with any type of system installed on vehicles.

10 Claims, 7 Drawing Sheets

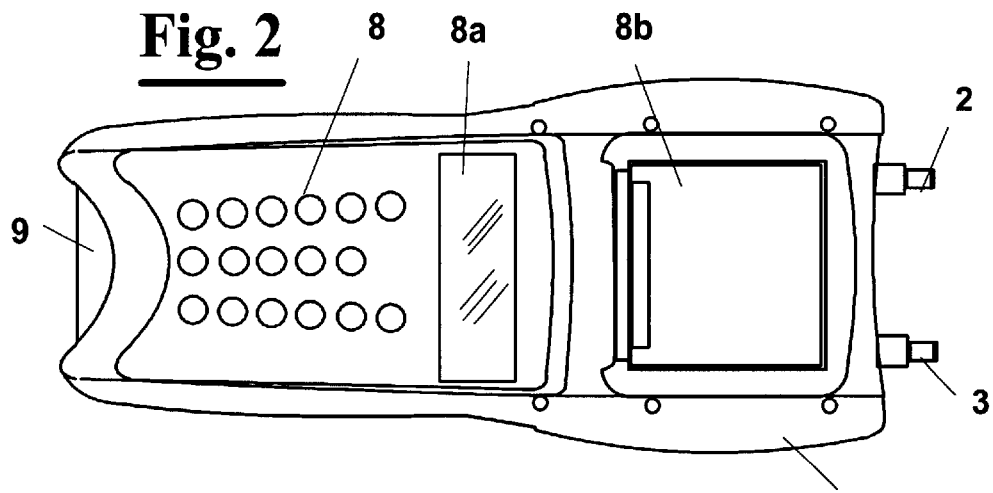
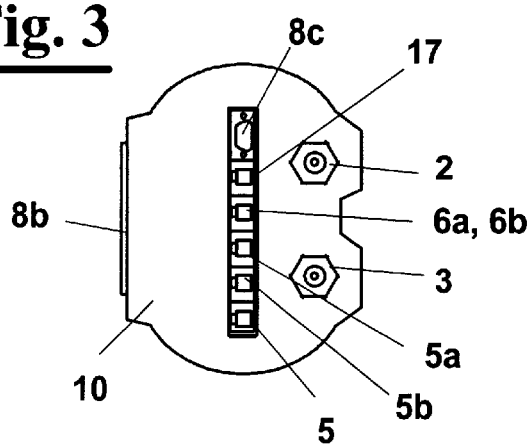
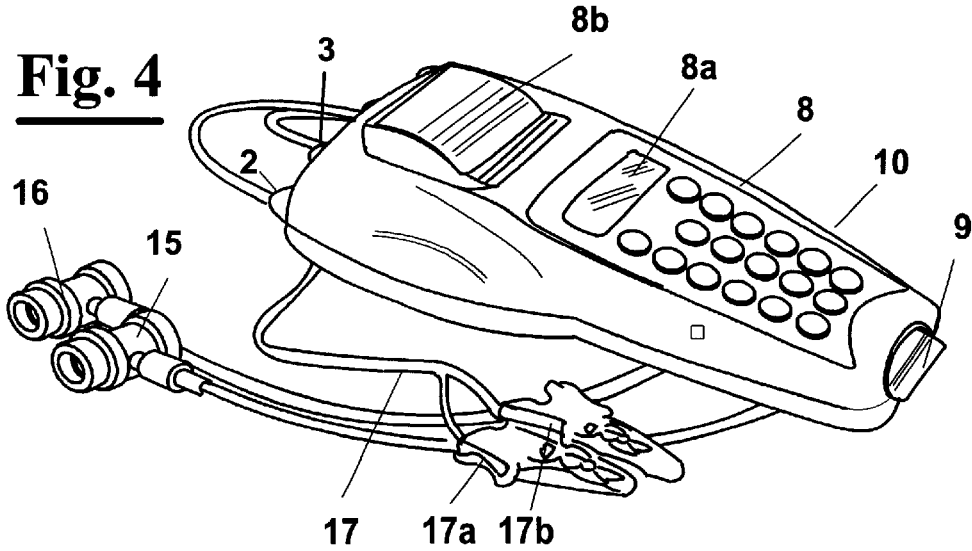

Fig. 8

- D1: Lack of fluid in the system
- D2: -clutch cycling switch / -Suction line blocked
- D3: -Lack of fluid in the system / - capillar valve
- D4: - capillar valve / -Condenser of tube blocked / -Air flow evaporator
- D5: *System ok*
- D6: -Excess of fluid / -Wrong air flow at the condenser / -Air in the system
- D7: - Control mixing lid
- D8: -Reverse high and low pressure
- D9: - Pulley doesn't engage / -Replace compressor
- D10: -Capillar valve
- D11: - Pulley doesn't engage

Fig. 9

- D1: - Lack of fluid in the system
- D2: - Lack of fluid in the system / - frozen evaporator
- D3: - frozen evaporator / - Replace Filter / - Expansion valve blocked
- D4: - Lack of fluid in the system
- D5: *System ok*
- D6: - Replace expansion valve
- D7: - Pulley doesn't engage / -Replace compressor
- D8: -Pulley doesn't engage
- D9: - Control mixing lid
- D10: - Reverse high and low pressure
- D11: -Excess of fluid / - Wrong air flow at the condenser / - Air in the system

METHOD AND DEVICE FOR TESTING AND DIAGNOSING AIR-CONDITIONING APPARATUS ON VEHICLES

PRIORITY STATEMENT

This application claims priority to European Patent Application, Serial Number EP00116518.2, filed Jul. 31, 2000.

FIELD OF THE INVENTION

The present invention relates to an improved method for testing and diagnosing an air-conditioning apparatus on a vehicle.

Furthermore, the invention relates to a device that carries out this method,

BACKGROUND OF THE INVENTION

Air-conditioning apparatuses on vehicles require frequent servicing by expert staff able to control system breakdown that cannot easily be found, such as a lack or excess of refrigerant, an incorrect setting of the system, failure of the compressor, and problems at the capillary valve and other components.

Traditionally, an air conditioning circuit for cars comprises, in sequence, a compressor, a high pressure warm side with a warm exchanger or condenser, an expansion valve or capillary valve, and a low pressure cool side with a cool exchanger or evaporator.

In WO98/54019, in the name of the same applicant, an automatic device is described for testing and diagnosing air-conditioning apparatuses on vehicles. This device comprises a sensor of the environment temperature, a low pressure sensor located on the cool side, a high pressure sensor located on the warm side, and a control unit for comparing the values measured by the sensors with respect to fixed values of environment temperature, low pressure, and high pressure. After the comparison, the control unit selects and displays a diagnosis message chosen from a predetermined list.

The device described above, even if normally effective, cannot be used for diagnoses of systems with a so called orifice tube system with or without a clutch cycling switch. Moreover, its diagnostic precision can be improved.

SUMMARY OF THE INVENTION

It is therefore one object of the present invention to provide an improved method for testing and diagnosing an air-conditioning apparatus that is capable of working with any type of system installed on a car.

It Is another object of the invention to provide an improved device that performs this method.

These objects are achieved by the method and device of the present invention that has the characteristic of providing, in addition to measuring the environment temperature and the pressure upstream/downstream the compressor, a measurement of the temperature of the cold air at the exit of the evaporator.

This additional value allows the application of the device and diagnostic method to any conditioning system consisting of orifice tube systems with or without a clutch cycling switch, as well as to expansion valve systems.

Preferably, the method includes an input step in which the type of conditioning system is entered and a logic of control is provided that calculates the parameters of operation responsive to said input data. Advantageously, the input step is carried out by means of a magnetic card that can be Inserted at the beginning of the measuring phase.

The device according to the invention comprises, in addition to means for measuring the pressure upstream and downstream of the compressor and sensors means of the environment temperature, sensor means for determining the air temperature coming from the evaporator.

A logic of control is provided that receives as input two values of pressure and two values of temperature, respectively. The values are the pressure of the conditioning circuit's warm and cool sides upstream and downstream of the compressor, the environment temperature, and the air temperature at the exit from the evaporator. In this control logic, algorithms are implemented that display messages of malfunction, which allow a user to quickly determine the type of failure, or display a message of correct operation, All the principal features of the invention am defined by the independent claims. The dependent claims define preferred aspects of the invention same.

BRIEF DESCRIPTION OF THE DRAWING

Further characteristics and the advantages of the method and device according to the invention will be made clearer with the following description of an embodiment thereof, exemplifying but not limitative, with reference to the attached drawings, wherein:

FIG. 2 shows a top plan view of a device for testing and diagnosing air-conditioning systems according to the invention having the structure of FIG. 1;

FIG. 3 is a front view according to arrow III of FIG. 2;

FIG. 4 is a perspective view of the embodiment of FIGS. 2 and 3;

FIGS. 8 and 9 show the list of diagnoses chosen automatically by the apparatus of FIGS. 1–4 in the case of the orifice tube system with or without clutch cycling switch, respectively, of FIGS. 6 and 7 and of the expansion valve system of FIG. 5.

DESCRIPTION OF A PREFERRED EMBODIMENT

Figure 1:
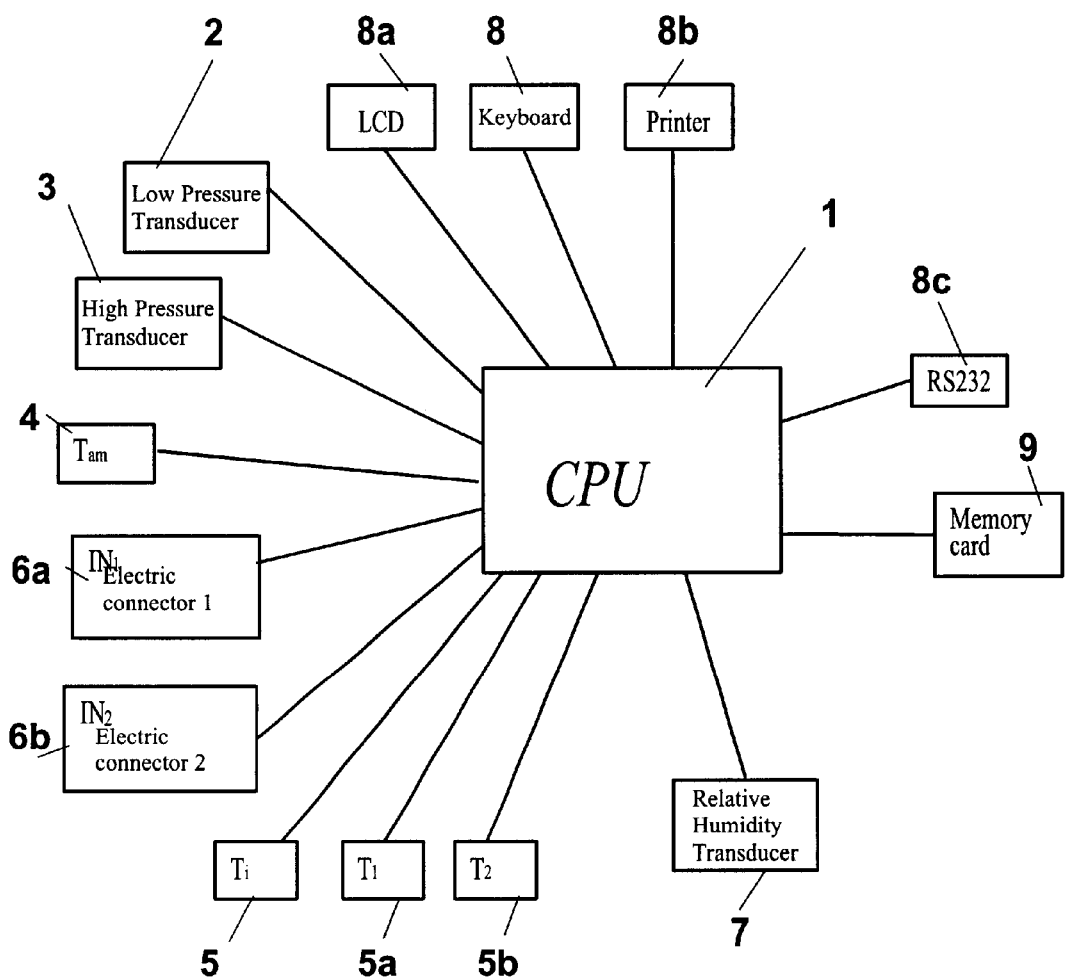
FIG. 1 is a block diagram of a device for testing and diagnosing air-conditioning systems according to the invention.

With reference to FIG. 1, the device for testing and diagnosing a car air-conditioning apparatus comprises:

a control unit 1, indicated as CPU and based on a microprocessor;

a first sensor 2 for measuring the low pressure, LP, upstream the compressor;

a second sensor 3 for measuring the high pressure, HP, downstream the compressor;

a third sensor 4 for measuring the environment temperature, Ta;

a fourth sensor 5 for measuring the temperature, Ti, at the air outlet in the car;

sensors of auxiliary temperatures, 5a and 5b;

a couple of connectors, 6a and 6b, for measuring the voltage at the ends of the clutch cycling switch in the orifice tube systems with clutch cycling switch;

a sensor of relative humidity 7;

a data input unit 8, in this embodiment a keyboard;

a unit 8a for displaying the data, in this embodiment an alphanumeric LCD, and/or a printing unit 8b;

connector of RS232 type for communicating with a computer; and an external memory unit 9, in this embodiment a memory card, with relative interface (not shown).

With reference to FIGS. 2 through 4, a device that implements the structure of FIG. 1 is indicated with the numeral 10. At the rear side (FIG. 3) of device 10, the following connections are provided: screw threaded sockets of low pressure 2 and of high pressure 3; connectors for cables of the temperature sensors 5, 5a, and 5b; and connectors 6a and 6b for measuring the voltage at the ends of the clutch cycling switch. The device is supplied energy from the battery of the car through the connector cable 17 and clamps 17a and 17b (FIG. 4). Keyboard 8, display 8a, printer 8b, connector 8c for communicating with the computer 11 (FIG. 4), and memory card 9 are also shown.

Figure 5:
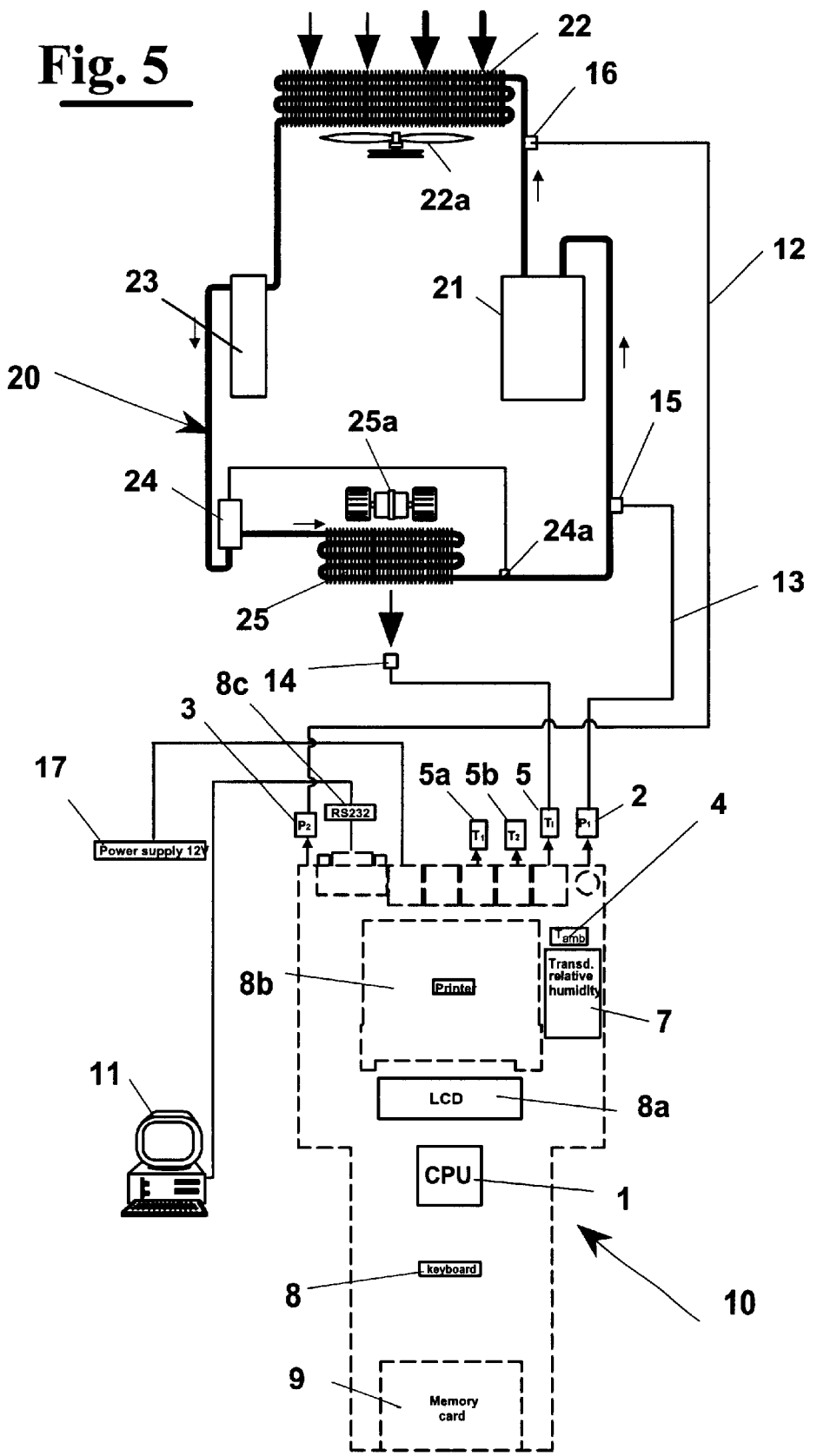
FIGS. 5, 6, and 7 show the connection of the embodiment of the previous figures to three different types of conditioning systems and, respectively, an expansion valve system, an orifice tube system with clutch cycling switch, and an orifice tube system without clutch cycling switch.
Figure 6:
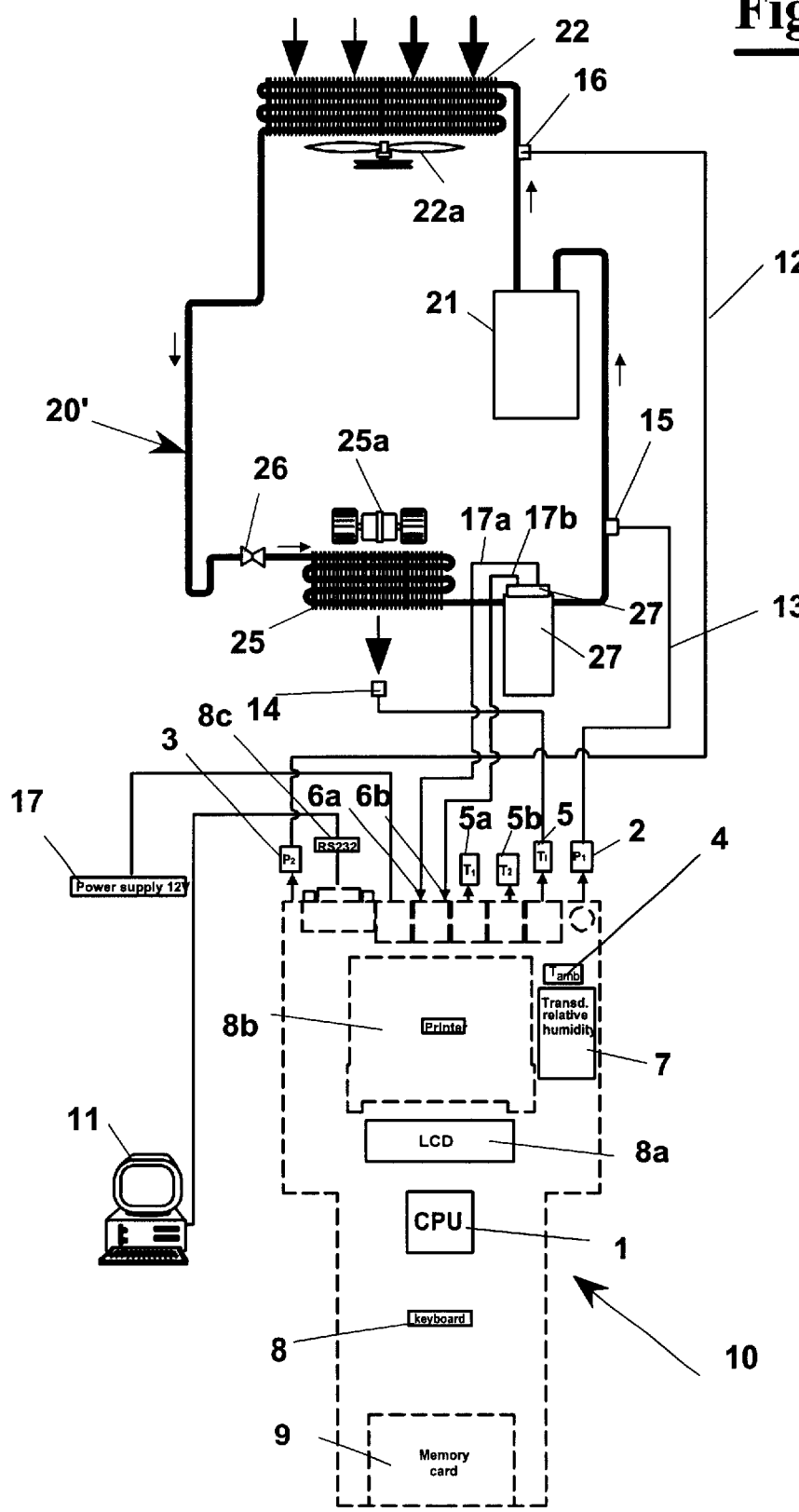
Figure 7:
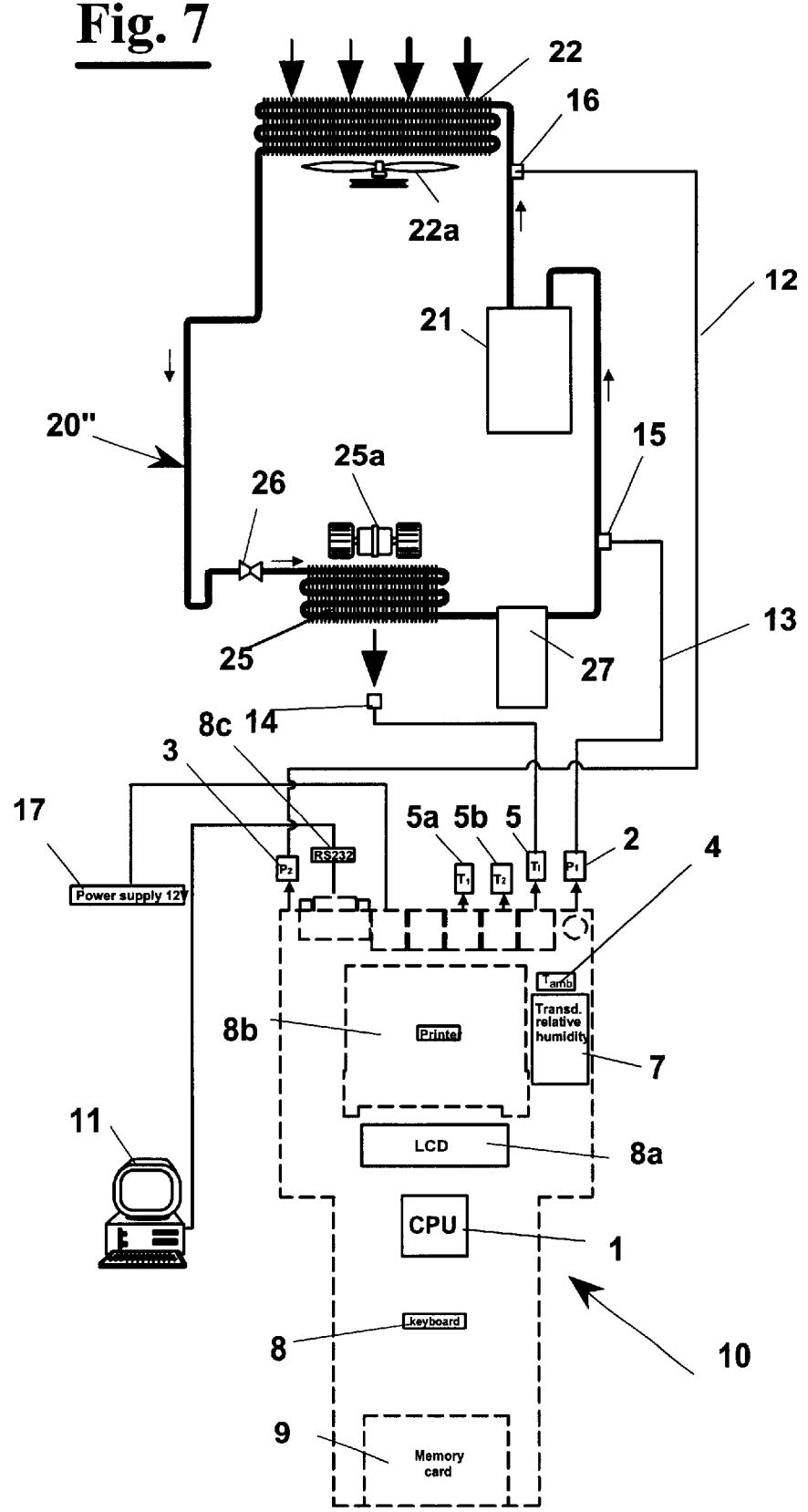

In FIGS. 5 through 7, the application of the device according to the invention to three types of conditioning circuits is shown. The three types of conditioning circuits shown are expansion valve system, an orifice tube system with clutch cycling switch, and an orifice tube system without clutch cycling switch, respectively.

Common to the three systems, indicated by 20, 20' and 20", respectively, are compressor 21, a warm exchanger or condenser 22 with a relative fan 22a, an expansion valve 26, which in the apparatus 20 of FIG. 5 is a thermostatic valve 24, and an evaporator or cool exchanger 25 with a relative fan 25a.

In particular the expansion valve system 20 of FIG. 5 has a filter 23 and a thermostatic valve 24 that adjusts the flow through a capillary valve responsive to the temperature of the refrigerant fluid measured downstream of evaporator 25. In this way, it is possible to adjust the flow rate of the fluid and then the outlet temperature at the evaporator according to the regime of operation of the engine of the car.

Orifice tube systems, with or without clutch cycling switch 20' and 20" of FIGS. 6 and 7, have instead an inflexible capillary valve 26 and a liquid receiver 27 for compensating for the presence of fluid at the liquid state at the outlet of the evaporator. In certain cases variable displacement compressors am used for adjusting the flow rate.

The operation of the device according to the invention is described with reference to all three systems, 20, 20' and 20" of FIGS. 5, 6, and 7 as follows:

Once connected, the pressure sensors 2 and 3 of the conditioning system operate by means of swift fittings 15 and 16. A sensor 14 is positioned for measuring the temperature at the air outlet in the car, cabled to connector 5 of the input of the air temperature at the evaporator. In the case of an orifice tube system with clutch cycling switch (FIG. 6), two connectors 6a and 6b are plugged at the ends of the dutch cycling switch 27a present on liquid variator 27.

The diagnostic program located in the memory of the microprocessor is then initiated.

Figure 10:
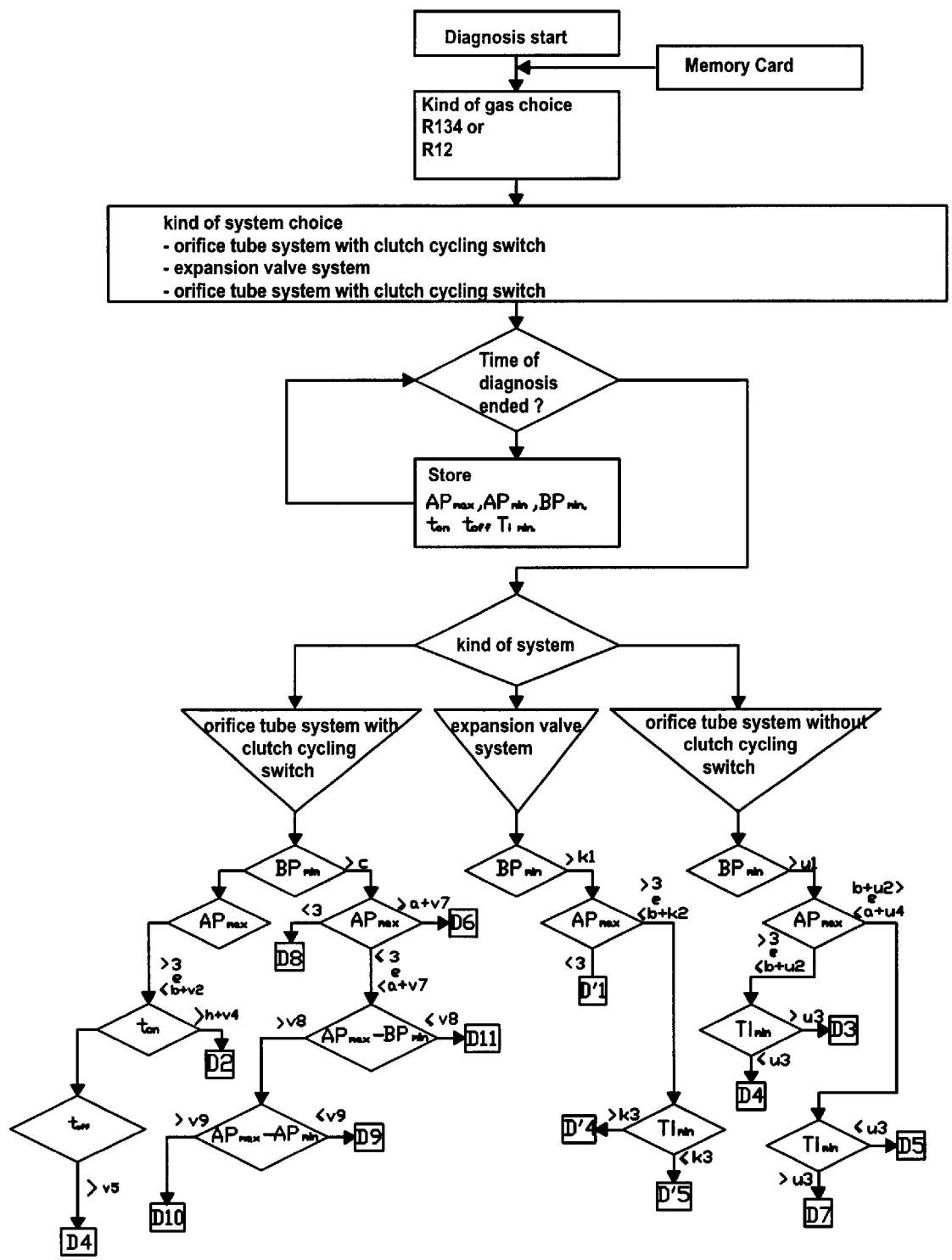
FIG. 10 is a flowchart diagram of the operative steps of the device of FIG. 1.

With reference to FIG. 10, wherein a portion of the flowchart diagram of a preferred embodiment of the program is shown, the diagnostic method according to the invention includes the step of storing preliminarily in the memory of the microprocessor, the minimum and maximum pressure values, $HP_{min}$ and $HP_{max}$, determined at 16 at the high pressure side, the minimum pressure value, $LP_{min}$, determined at 15 on the low pressure side, and the minimum temperature value, $Ti_{min}$, at the air outlet in the car measured at 14 as a result of the environment temperature, $Ta$, measured at 4 in normal operating conditions of the apparatus. In the case of an orifice tube system with clutch cycling switch 20', the value of the average time in which the compressor of the apparatus is in operation, $t_{on}$, and the average time the compressor is not in operation, $t_{off}$, are previously determined and stored. The $t_{on}$ and $t_{off}$ values are a function of the environmental temperature, $Ta$, during normal operating conditions of the apparatus. Trough keyboard 8, the type of refrigerant used, R12 or R134a, and the type of conditioning system, traditional (expansion valve) or an orifice tube system with or without dutch cycling switch, are entered.

It is apparent that, through use of the memory card 9, the selection of the type of gas and of the type of apparatus can be entered automatically on the basis of previously stored data on the card.

The device proceeds, then, for a predetermined diagnosis time, t (for example, 120 sec.), sampling: environment temperature, $Ta$ (diagnosis beginning value), temperature, $Ti$, at the air outlet in the car, and pressure values, $HP$ and $LP$, on the high and low pressure sides. The sampling time is typically 500 msec.

According to the invention, the present diagnostic method determines the following values:

starting value, $Ta$, of the environment temperature:

minimum value of pressure, $LP_{min}$, determined on the low pressure side at the time of diagnosis;

minimum value of pressure, $HP_{min}$, determined on the low pressure side at the time of diagnosis;

maximum value of pressure, $HP_{max}$, determined on the high pressure side at the time of diagnosis; and minimum value of the temperature, $Ti_{min}$, determined at the air outlet in the car at the time of diagnosis.

In the case of an apparatus of the orifice tube system type with a clutch cycling switch, the following parameters are also determined:

Average time of operation, $t_{on}$, at the electromagnetic coupling of the compressor of the apparatus; and Average time of disconnection, $t_{off}$, at the electromagnetic coupling of the compressor of the apparatus.

These average times are determined by means of the connectors 6a, 6b and are calculated in the following way:

$$t_{on} = \frac{\sum \text{time of operation at the electromagnetic coupling of the compressor}}{n. \text{ of cycles}}$$

$$t_{off} = \frac{\sum \text{time of disconnection at the electromagnetic coupling of the compressor}}{n. \text{ of cycles}}$$

On the basis of the determined values ($Ta$, $LP_{min}$, $HP_{min}$, $HP_{max}$, $Ti_{min}$ and, in the case of orifice tube system with clutch cycling switch, also $t_{on}$ and $t_{off}$) and of the reference values previously stored or extracted from the memory card ($AP_{max}$, $HP_{min}$, $LP_{min}$, $Ti_{min}$, and in the case of orifice tube system with clutch cycling switch, also $t_{on}$ and $t_{off}$, the processor selects a diagnostic message chosen from a predefined list stored in the memory of the microprocessor. In FIGS. 8 and 9, some possible examples are shown of diagnostic messages, D1–D11, respectively, for orifice tube systems with or without clutch cycling switch and expansion valve systems.

With reference again to FIG. 10, the comparison is then made of the following values: $LP_{min}$, $HP_{max}$, $HP_{max}$-$AP_{min}$, $HP_{max}$-$BP_{min}$; $Ti_{min}$ or, in the case of orifice tube system with clutch cycling switch of $LP_{min, HPmax}$, $HP_{max}$-$AP_{min}$, $HP_{max}$-$BP_{min}$; $Ti_{min}$, $t_{on}$, $t_{off}$, with a set of reference parameters. After the comparison, the display of messages D1, D2, . . . D1, respectively, of FIGS. 9 and 8, according to predetermined sequences of conditions wherein said values overcome or are less than said parameters. The parameters have been indicated in FIG. 10 as:

parameters a, b, g, and h that pertain to the environment temperature, T$a$, and to the type of refrigerant used, such as R12 or R134$a$;

parameter c that pertains to the type of refrigerant used, such as R12 or R134$a$;

parameters v0 . . . v9 that are used with an orifice tube system with clutch cycling switch;

parameters u0 . . . u6 that refer to an orifice tube system without clutch cycling switch; and parameters k0 . . . k6, that pertain to an expansion valve system.

Parameters v0 . . . v9, u0 . . . u6, and k0 . . . k6 are used selectively to compare the difference of the trend of the pressure between the three types of conditioning systems described above and to change selectively the parameters used in the diagnosis for each type of car stored in the memory card.

The above device allows the testing and diagnosis of any car conditioning system.

The foregoing description of a specific embodiment will so fully reveal the invention according to the conceptual point of view that others, by applying current knowledge, will be able to modify and/or adapt the method or device of such an embodiment for various applications without further research and without parting from the invention. It is therefore to be understood that such adaptations and modifications will be equivalent to the specific embodiment. The means and the materials to realize the different functions described herein could have a different nature without, for this reason, departing from the field of the invention. It is to be understood that the phraseology or terminology employed herein is for the purpose of description and not of limitation.

Claims:

1. A method for testing and diagnosing air-conditioning apparatus on vehicles, said systems comprising a high pressure side with a condenser, a low pressure side with an evaporator through which cool air is created, said sides being respectively downstream and upstream of a compressor, comprising the steps of:

measuring the pressure value HP on the high pressure side;

measuring the pressure value LP on the low pressure side;

measuring the environment temperature value T$a$ characterized in that it comprises the further steps of:

measuring the temperature value Ti of the air coming from the evaporator;

storing the values of the pressures (AP,BP) and of the temperatures (T$a$ and T$i$) measured in a predetermined range of time (t) in a computing unit wherein a program of diagnosis is residing;

running the program of diagnosis on the basis of the values stored and displaying messages of diagnosis responsive to the values measured.

2. Method according to claim 1 wherein, within a diagnosis time t:

said measuring step of the pressure HP on the high pressure side provides a measure of the maximum and minimum values of the pressure $HP_{max}$ and $HP_{min}$;

said measuring step of the pressure LP on the low pressure side provides a measure of the minimum value of the pressure $LP_{min}$;

said measuring step of the temperature Ti of the air coming from the evaporator provides a measure of the minimum temperature value $Ti_{min}$.

3. Method according to claim 1, wherein in the case of orifice tube system with clutch cycling switch the values are previously measured of the average time ton of operation of the compressor of the apparatus and the average time $t_{off}$ of disconnection of the compressor responsive to the environment temperature (T$a$) in normal conditions of operation of the apparatus.

4. Method according to claim 1, wherein before running said program of diagnosis an input step is provided of parameters of the conditioning apparatus pertaining to:

type of refrigerant used, chosen between R12 or R134$a$, type of conditioning system present, chosen among traditional (expansion valve system), orifice tube system with clutch cycling switch, orifice tube system without clutch cycling switch.

5. Method according to claim 1, wherein said input step is executed by means of an insertable magnetic support on which said parameters of the circuit have been previously stored.

6. Method according to claim 2 or 3, wherein said program of diagnosis comprises the following steps:

Input of the data of the conditioning apparatus,

Start counter of the time of diagnosis,

Detection, in the time of diagnosis, of the values of $HP_{min}$; $HP_{max}$; $LP_{min}$; $Ti_{min}$; and, in the case of orifice tube systems with clutch cycling switch, also of $t_{on}$ and $t_{off}$;

Comparison of the following values $LP_{min}$, $HP_{max}$, $HP_{max}$-$AP_{min}$, $HP_{max}$-$BP_{min}$; $Ti_{min}$, or, in the case of orifice tube systems with clutch cycling switch of $LP_{min}$, $HP_{max}$, $HP_{max}$-$AP_{min}$, $HP_{max}$-$BP_{min}$; $Ti_{min}$, $t_{on}$, $t_{off}$, with a set of parameters of reference, and transmission of messages D1, D2, . . . according to predetermined sequences of conditions wherein said values overcome or are less than said parameters.

7. A device for testing and diagnosing air-conditioning apparatus on vehicles, said systems comprising a high pressure side with a condenser, a low pressure side with an evaporator from which cool air is created, said sides being respectively downstream and upstream of a compressor, comprising:

means for measuring the pressure HP on the high pressure side;

means for measuring the pressure LP on the low pressure side;

means for measuring the environment temperature T$a$ characterized in that it comprises:

means for measuring the temperature T$i$ of the air coming from the evaporator;

a microprocessor computing unit, operatively connected with said means for measuring, for storing the values of the pressures (AP,BP) and of the temperature (Ta and Ti) measured in a predetermined range of time (t) from said means for measuring, in said unit a program residing of diagnosis suitable for being run on the basis of the stored values;

means for producing diagnosis messages calculated by said program responsive to the measured values.

8. Device according to claim 7 wherein in the case of orifice tube system with clutch cycling switch means are provided for measuring the average time ton of operation of the compressor of the apparatus and of the average time $t_{off}$ of disconnection of the compressor responsive to the environment temperature (Ta) in normal conditions of operation of the apparatus.

9. Device according to claim 7, wherein means are provided for the input of parameters of the conditioning apparatus, among which:

type of refrigerant used, chosen between R12 or R134*a*, type of conditioning system present, chosen among traditional system (expansion valve system), orifice tube system with or without clutch cycling switch or orifice tube system without clutch cycling switch.

10. Device according to claim 9, wherein said means for input comprise an insertable magnetic support on which said parameters of the circuit have been previously stored, said device providing means for reading said magnetic support connected to said microprocessor computing unit.

* * * * *

UNITED STATES PATENT AND TRADEMARK OFFICE
CERTIFICATE OF CORRECTION

PATENT NO. : 6,629,420 B2
DATED : October 7, 2003
INVENTOR(S) : Marie Joseph Renders It is certified that error appears in the above-identified patent and that said Letters Patent is hereby corrected as shown below:

<u>Title page,</u>
Insert Item -- [73] Assignee:     North European Patents & Investments, H.S.A.,
Luxembourg (Germany) --

Signed and Sealed this

Twenty-fifth Day of May, 2004

JON W. DUDAS
*Acting Director of the United States Patent and Trademark Office*